United States Patent
Yamashita et al.

(10) Patent No.: US 9,944,084 B2
(45) Date of Patent: Apr. 17, 2018

(54) INK JET RECORDING METHOD AND INK JET RECORDING APPARATUS

(71) Applicant: CANON KABUSHIKI KAISHA, Tokyo (JP)

(72) Inventors: Otome Yamashita, Yokohama (JP); Soichi Nagai, Kawasaki (JP); Tomohiro Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/286,959

(22) Filed: Oct. 6, 2016

(65) Prior Publication Data
US 2017/0120601 A1    May 4, 2017

(30) Foreign Application Priority Data
Oct. 30, 2015    (JP) ................. 2015-213663

(51) Int. Cl.
| | |
|---|---|
| *C09D 11/38* | (2014.01) |
| *B41J 2/175* | (2006.01) |
| *B41J 2/14* | (2006.01) |
| *B41J 2/21* | (2006.01) |

(52) U.S. Cl.
CPC ........... *B41J 2/175* (2013.01); *B41J 2/14016* (2013.01); *B41J 2/17509* (2013.01); *B41J 2/21* (2013.01); *B41J 2/1752* (2013.01); *C09D 11/38* (2013.01)

(58) Field of Classification Search
CPC ...... B41J 2/175; B41J 2/17503; B41J 2/2107; B41J 3/30
See application file for complete search history.

(56) References Cited

U.S. PATENT DOCUMENTS

| | | | |
|---|---|---|---|
| 7,247,192 B2 | 7/2007 | Ohira et al. | |
| 7,690,762 B2 | 4/2010 | Ohira et al. | |
| 2005/0128272 A1* | 6/2005 | Morohoshi | .......... B41M 5/0023 347/100 |
| 2006/0124027 A1* | 6/2006 | Sato | .............. C09D 11/40 106/31.6 |
| 2007/0191508 A1* | 8/2007 | Nakagawa | .......... C09D 11/322 523/160 |

(Continued)

FOREIGN PATENT DOCUMENTS

JP    2004-083621 A    3/2004

*Primary Examiner* — Sharon A Polk
(74) *Attorney, Agent, or Firm* — Fitzpatrick, Cella, Harper & Scinto

(57) ABSTRACT

An ink jet recording method uses an apparatus including plural aqueous inks including cyan, magenta and yellow inks; a recording head that thermally ejects the inks; a first ink storage portion having an atmosphere communicating portion; a second ink storage portion which is a resinous housing and is directly bonded to the head; and a tube that supplies the inks from the first to second ink storage portions and includes first, second and third tubes corresponding to the respective inks, the second tube having a portion sandwiched between and joined to the first and third tubes. The method includes ejecting the inks from the head to record an image on a recording medium. The difference between the maximum and minimum values of water molar fractions of the cyan, magenta and yellow inks is 5.0% or less. The tube corresponding to the magenta ink is the second tube.

20 Claims, 3 Drawing Sheets

(56) References Cited

U.S. PATENT DOCUMENTS

| | | | | |
|---|---|---|---|---|
| 2010/0283824 A1* | 11/2010 | Daicho | ................ | B41J 2/3353 347/211 |
| 2012/0033021 A1* | 2/2012 | Nagaoka | ................ | B41J 2/175 347/85 |
| 2014/0184699 A1* | 7/2014 | Ito | ..................... | B41J 2/175 347/54 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

An ink jet recording method enables recording of images on various recording media. In order to produce better images, various inks such as inks suited for recording photographic quality images on glossy paper and the like and inks suited for recording documents on plain paper and the like, have been developed according to purposes.

In recent years, the ink jet recording method is also used, for example, for recording business documents containing characters, diagrams, and the like on plain paper or similar recording media, and has been markedly frequently used for such purposes. As the technique of the ink jet recording method develops, ink jet recording apparatuses are required to have higher durability and reliability in order to be usable for a long period of time and also to enable recording of a larger number of images, thereby achieving high productivity. To meet such a demand, an ink jet ink having a high surface tension and a small dissolved oxygen amount is disclosed, for example. This ink is sucked from ejection orifices on a recording head to suppress ejection failure, or what is called a higher purge restoration performance is improved (Japanese Patent Application Laid-Open No. 2004-083621).

In order to improve the productivity, the inventors of the present invention have studied an ink jet recording apparatus that includes a main tank and a sub tank as the ink storage portions to increase the amount of an ink stored. The inventors consequently have ascertained that the reliability is likely to be improved when the ink disclosed in Japanese Patent Application Laid-Open No. 2004-083621 having a small dissolved oxygen amount is used. However, when the above-mentioned ink jet recording apparatus is used to eject inks over a long period of time, another problem is caused. In other words, it is revealed that disorder is likely to be gradually caused on images even when the ink having a small dissolved oxygen amount is used. It has also been ascertained that when the above-mentioned ink jet recording apparatus is used over a long period of time, a color tone change of gray line images recorded by overlapping of a cyan ink, a magenta ink, and a yellow ink is likely to be caused.

An object of the present invention is thus to solve the problems caused when an ink jet recording apparatus including a main tank and a sub tank as the ink storage portions is used over a long period of time. In other words, the present invention aims to provide an ink jet recording method that enables the above-mentioned ink jet recording apparatus to maintain good ink ejection stability even when the ink jet recording apparatus is used over a long period of time and to record images for which a color tone change is suppressed. The present invention also aims to provide an ink jet recording apparatus used in the ink jet recording method.

SUMMARY OF THE INVENTION

The above objects are achieved by the following present invention. The present invention provides an ink jet recording method using an ink jet recording apparatus including a plurality of aqueous inks that include a cyan ink, a magenta ink, and a yellow ink, a first ink storage portion that has an atmosphere communicating portion, a second ink storage portion, a recording head that ejects the aqueous inks by action of thermal energy, and a tube that supplies the aqueous inks from the first ink storage portion to the second ink storage portion, the second ink storage portion being a housing formed of a thermoplastic resin and being bonded to the recording head without another member interposed therebetween, the tube including a first tube, a second tube, and a third tube respectively corresponding to the respective aqueous inks, the second tube having a portion interposed between and joined to the first tube and the third tube, the method including ejecting the aqueous inks from the recording head to record an image on a recording medium. In the ink jet recording method, a difference between a maximum value and a minimum value of water molar fractions (%) of the cyan ink, the magenta ink, and the yellow ink is 5.0% or less, and the tube corresponding to the magenta ink is the second tube.

The present invention can solve the problems caused when an ink jet recording apparatus including a main tank and a sub tank as the ink storage portions is used over a long period of time. In other words, the present invention can provide an ink jet recording method that enables the above ink jet recording apparatus to maintain good ink ejection stability even when the ink jet recording apparatus is used over a long period of time and to record images for which a color tone change is suppressed. According to the present invention, an ink jet recording apparatus used in the ink jet recording method can also be provided.

Further features of the present invention will become apparent from the following description of exemplary embodiments with reference to the attached drawings.

DESCRIPTION OF THE EMBODIMENTS

Figure 1:
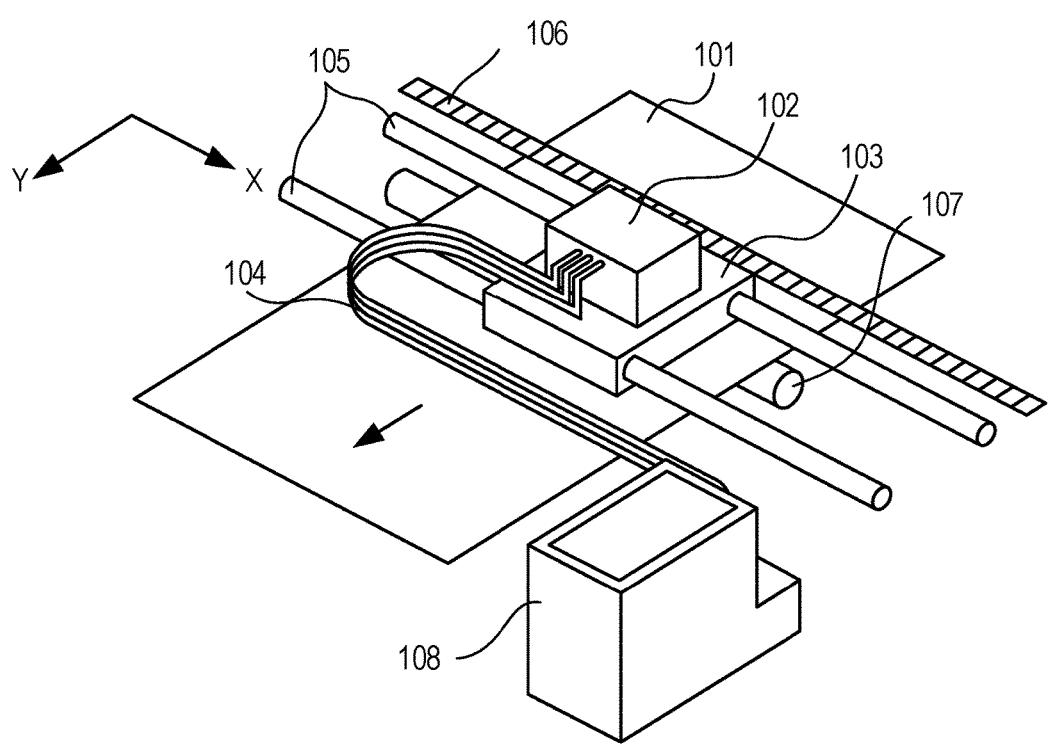
FIG. 1 is a perspective view schematically showing an embodiment of an ink jet recording apparatus of the present invention.

Preferred embodiments of the present invention will now be described in detail in accordance with the accompanying drawings. In the following description, an aqueous ink for ink jet may also be referred to as "ink", a first ink storage portion may also be referred to as "main tank", and a second ink storage portion may also be referred to as "sub tank". Physical property values are values determined at normal temperature (25° C.) unless otherwise noted.

First, the inventors of the present invention have studied the cause of disorder of images caused when an ink jet recording apparatus including a main tank having an atmosphere communicating portion and a sub tank is used to eject inks over a long period of time. The result has indicated that bubbles are likely to enter an ink flow path in a recording head when an ink is ejected from the recording head to record a large number of images, and the infiltrated bubbles prevent normal ejection of the ink to cause disorder of images. Next, the inventors of the present invention have specifically studied the reason of causing such a phenomenon. The result has indicated that an ink containing dissolved gas that is increased in the main tank is supplied through the sub tank to the recording head and, consequently the bubbles adhere to the ink flow path in the recording head to prevent normal ejection of the ink. These phenomena will next be described.

A case of using an ink jet recording apparatus including a main tank having a large volume is used in order to improve productivity is supposed. The main tank has an atmosphere communicating portion. When such an ink jet recording apparatus is used to eject an ink from a recording head over a long period of time and the ink is consumed, the following phenomenon occurs. In other words, as the ink is consumed, the liquid level of the ink in the main tank is lowered, and air is introduced in the main tank through the atmosphere communicating portion. When the main tank has a large volume, a large amount of air is taken in to lower the liquid level, and the ink is stored for a long period of time. In the case of an ink jet recording apparatus including such a main tank having a large volume, an ink is in contact with air for a markedly longer period of time as compared with a conventional ink jet recording apparatus including a tank having a typical volume. Air is thus likely to be dissolved in the ink, and the dissolved gas amount in the ink gradually increases.

In the process in which an ink containing dissolved gas that is increased in the main tank is supplied through the sub tank to the recording head, the following phenomenon is supposed to be caused. The ink supply system includes members having various flow path diameters, such as an ink supply tube, a sub tank, and an ink flow path in a recording head. Accordingly, there are points at which an ink flow suddenly changes due to a change of flow path diameters. When the flow of an ink containing a large amount of dissolved gas suddenly changes at such a point, bubbles are likely to be formed. As the ink is supplied, the formed bubbles reach to the recording head and adhere to the ink flow path, and thus normal ejection of the ink is supposed to be prevented.

The inventors of the present invention have studied the technique for preventing bubbles from entering into an ink flow path even in a condition in which the dissolved gas amount in the ink is likely to increase and for maintaining good ejection stability of the ink. The result has indicated that the entering of bubbles into an ink flow path is suppressed by allowing the formed bubbles to readily move in a direction of going away from the ink flow path. The inventors of the present invention have further studied the structure for allowing bubbles to readily move in a direction of going away from the ink flow path. The result has revealed that the structure in which the sub tank is a housing formed of a thermoplastic resin and the sub tank (housing) is bonded to a recording head (recording element substrate) without any other members such as a heat-dissipating plate interposed therebetween is effective. By providing a sub tank having such a structure, bubbles are prevented from entering into an ink flow path even when an ink is ejected over a long period of time, and good ejection stability of the ink is maintained. The mechanism of such an effect is supposed as follows: A means for dissipating heat, such as a heat-dissipating plate, is not included, thus thermal energy applied to the recording head for ejecting an ink is also transferred to an ink in the sub tank, and the temperature of the ink increases. It is supposed that bubbles expand to lower the density as the temperature of the ink increases, and thus the bubbles are likely to move in the direction opposite to the gravity direction (the ink flow direction).

It has been revealed that in the case of an ink jet recording apparatus including a main tank having a large volume, an ink is likely to evaporate from constituent members of the apparatus, particularly from an ink supply tube. When the tubes are made from a similar material each other, a difference in evaporation rate of inks causes color tone changes on gray line images recorded by overlapping of a cyan ink, a magenta ink, and a yellow ink. In particular, when the ink supply tube includes a first tube, a second tube, and a third tube respectively corresponding to the respective inks and the second tube has a portion interposed between and joined to the first tube and the third tube, the difference in evaporation rate of the inks is likely to arise. This is supposed to be because the tube surface areas of the first tube and the third tube differ from that of the second tube, or the areas in contact with air differ.

It has also been revealed that when the case in which the tube corresponding to the magenta ink is the first tube or the third tube is compared with the case in which the tube corresponding to the magenta ink is the second tube, a color tone change degree is smaller in the latter case. This is supposed to be because in general, of color tone changes caused on gray line images, a reddish color tone change is likely to be sensitively detected. When the tube corresponding to the magenta ink is the first tube or the third tube, the evaporation rate of the magenta ink becomes higher than the evaporation rates of the cyan ink and the yellow ink. On this account, the concentration of a coloring material in the magenta ink increases as water evaporates, and an initially designed relation of color developability among the inks is likely to deteriorate. Accordingly, redness of gray line images recorded by overlapping of the cyan ink, the magenta ink, and the yellow ink is strongly observed. From the above discussion, the inventors of the present invention have found that the tube corresponding to the magenta ink is required to be the second tube in order to effectively suppress color tone changes caused on gray line images. However, it has been revealed that color tone changes caused on gray line images are not sufficiently suppressed even when the tubes are assigned in such a manner as mentioned above.

In order to prevent bubbles from infiltrating an ink flow path and to maintain good ejection stability of the ink, a case of adopting the following structure is assumed. In other words, a structure in which a housing formed of a thermoplastic resin is used as the sub tank and the sub tank is bonded to a recording head (recording element substrate) without any other member such as a heat-dissipating plate interposed therebetween is assumed. In this case, a means for dissipating heat, such as a heat-dissipating plate, is not included, thus temperature nonuniformity is likely to be caused in an ink flow path in the recording head, and this causes a difference in progress of water evaporation from each ink. Hence, the inventors of the present invention have further studied focusing on "water molar fraction" of each ink in order to make uniform the progress of water evaporation from each ink.

A recording head in which ejection orifice arrays for a cyan ink, a magenta ink, and a yellow ink are provided on one recording element substrate is typically configured in such a way that the ejection orifice arrays are collectively capped with a single covering member (cap) to prevent water from evaporating from the ejection orifices. When the ejection orifice arrays are capped, the inside of the cap is substantially tightly sealed and thus is saturated with water vapor due to the evaporation of water from the ejection orifices. It is difficult to actually measure the humidity of the inside of the cap. However, even when the progress of water evaporation from inks varies, the humidity in the cap is supposed to equilibrate to be in an averaged condition. In other words, it is supposed that in the cap, water evaporation becomes in an equilibrium state between the inks and the inside of the cap. Here, a case in which inks have greatly different "water molar fractions" is assumed. In this case, water preferentially evaporates from an ink having a higher water molar fraction. Accordingly, at the vicinity of an ejection orifice for an ink having a higher water molar fraction, other components of the ink than water are concentrated. In contrast, for an ink having a lower water molar fraction, water vapor is absorbed therein as water. Accordingly, at the vicinity of an ejection orifice for an ink having a lower water molar fraction, the components of the ink are diluted. By the balance of such phenomena, it is supposed that water moves so as to equate the water molar fractions of inks at the vicinity of ejection orifices.

Such water movement occurs not only in a cap but also in the case of no capping, or in the state in which ejection orifice arrays are open to the atmosphere, for example. However, a condition in which inks having various water molar fractions are collectively capped with one cap is supposed to be particularly harsh from the viewpoint of variations of water molar fraction. This is because the following phenomenon is caused in a process of becoming a condition of water vapor saturation. In other words, the water molar fraction of an ink having a high water molar fraction decreases, while the water molar fraction of an ink having a low water molar fraction increases.

In consideration of the above discussion, the inventors of the present invention have further studied, and consequently have found that it is important to satisfy the following requirements (i) and (ii) when the ink supply tubes having the above structure are used.

(i) The difference between the maximum value and the minimum value of the water molar fractions (%) of the cyan ink, the magenta ink, and the yellow ink is 5.0% or less.

(ii) The tube corresponding to the magenta ink is the second tube.

When the requirements (i) and (ii) are satisfied, an extreme increase in concentration of a coloring material in the magenta ink is suppressed, and the water movement between inks is reduced. Accordingly, a color tone change of gray line images recorded by overlapping of the cyan ink, the magenta ink, and the yellow ink can be suppressed. In order to more effectively suppress a color tone change of images, the difference between the maximum value and the minimum value of the water molar fractions (%) of the cyan ink, the magenta ink, and the yellow ink is preferably 3.0% or less and more preferably 1.0% or less. The difference between the maximum value and the minimum value of the water molar fractions (%) of the cyan ink, the magenta ink, and the yellow ink may be 0.0%.

In the present invention, "water molar fraction" is a value calculated only for compounds that have "a molecular weight of 300 or less" and can be "dissolved in water at such a content as to be present in an aqueous ink". The reason why only the compounds having "a molecular weight of 300 or less" are used to calculate the water molar fraction is that compounds having a sufficiently larger molecular weight as compared with water do not substantially affect the water molar fraction in a typical content in an aqueous ink. The reason why only the compounds that can be "dissolved in water" are used to calculate the water molar fraction is that components such as metals that have a molecular weight of 300 or less but are obviously not dissolved in water are not required to be considered. In addition, compounds such as pigments and resin particles that are not dissolved in water have a much higher molecular weight as compared with water, and the molar number of such a compound is extremely small at a typical content in an aqueous ink. Thus, such compounds are not required to be considered. In addition, of the compounds dissolved in water in an ink, compounds contained in a content of 1.0% by mass or more are considered. Such a condition is substantially sufficient for achieving the effects of the invention. The compound satisfying the above definition can be practically exemplified by the water-soluble organic solvents (including solid substances) described later.

"Water molar fraction" is calculated in accordance with the equation [(molar number of water)/(molar number of water+molar number of water-soluble compounds having a molecular weight of 300 or less)]×100(%). The calculation process of the water molar fraction will be described with reference to an ink M1 prepared in an example described later. The values in the parentheses are molecular weights; the content of water is the total content including water in a dye aqueous solution; and the molar number of each component is a value per 100 g of the ink. A dye and a surfactant (Acetylenol E 100) are water-soluble compounds but have a molecular weight of more than 300 and thus are excluded from the calculation.

Glycerol (92.094): 10.0% by mass, 0.109 mol
2-Pyrrolidone (85.106): 5.0% by mass, 0.059 mol
Triethylene glycol (150.176): 6.5% by mass, 0.043 mol
Water (18.016): 74.0% by mass, 4.107 mol
"Water molar fraction"=[4.107/(4.107+0.109+0.059+0.043)]×100=95.1%

The ink jet recording method of the present invention and an ink jet recording apparatus, a recording head, an aqueous ink, and the like suitably used in the ink jet recording method will now be described.

<General Structure of Ink Jet Recording Apparatus>

The ink jet recording method of the present invention is a recording method using an ink jet recording apparatus that includes a plurality of aqueous inks, a first ink storage portion having an atmosphere communicating portion, a second ink storage portion, a recording head, and ink supply tubes. The ink supply tubes are tubes for supplying the aqueous inks from the first ink storage portion to the second ink storage portion. The ink jet recording method of the present invention and an ink jet recording apparatus used in the method will be specifically described hereinafter with reference to drawings.

FIG. 1 is a perspective view schematically showing an embodiment of the ink jet recording apparatus of the present invention. The ink jet recording apparatus of the embodiment shown in FIG. 1 is what is called a serial-type ink jet recording apparatus that records images by bi-directional scanning of a recording head in the X direction (main scanning direction). A recording medium 101 is intermittently conveyed in the Y direction (sub scanning direction) by a conveyor roller 107. A recording unit 102 installed on a carriage 103 is reciprocated and scanned in the X direction (main scanning direction) orthogonal to the Y direction that is the conveyance direction of the recording medium 101. By the conveyance of the recording medium 101 in the Y direction and the bi-directional scanning of the recording unit 102 in the X direction, recording is performed.

Figure 2:
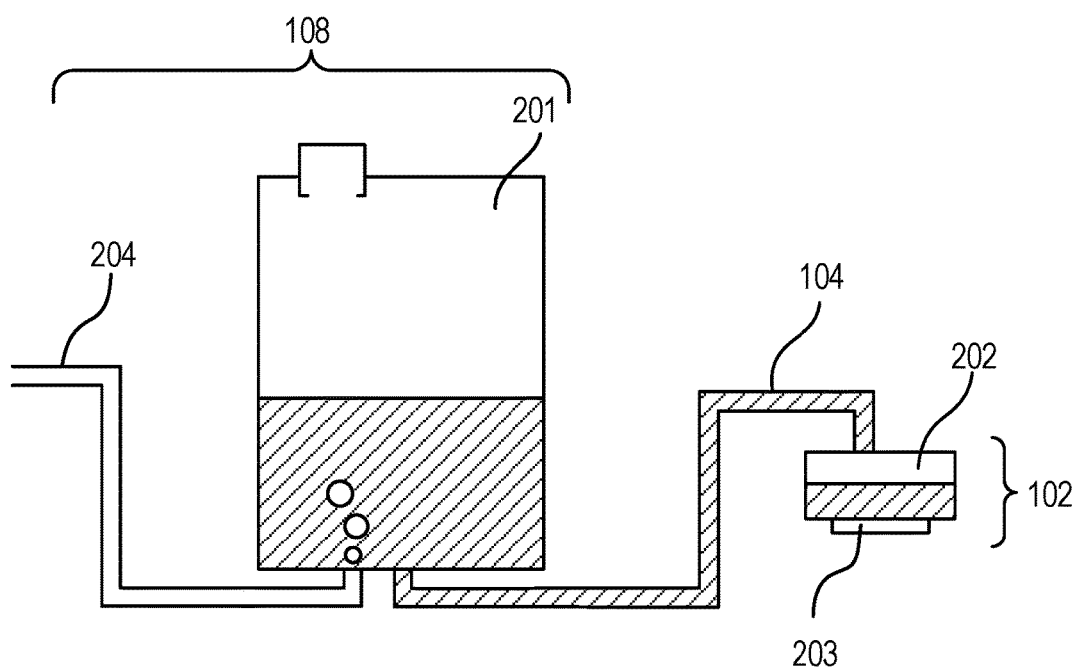
FIG. 2 is a schematic view showing an example of an ink supply system.

FIG. 2 is a schematic view showing an example of an ink supply system. As shown in FIG. 2, the recording unit 102 includes an ink jet recording head 203 having a plurality of ejection orifices from which a supplied ink is ejected and includes a sub tank 202 as the second ink storage portion. The recording unit 102 is installed on a carriage 103 as shown in FIG. 1. The carriage 103 is supported in such a way as to be movable along guide rails 105 placed along the X direction and is fixed to an endless belt 106 that moves in parallel with the guide rails 105. The endless belt 106 reciprocates by the driving force of a motor. The carriage 103 is reciprocated and scanned in the X direction by the reciprocation of the endless belt 106.

As shown in FIG. 2, a main tank 201 as the first ink storage portion is stored in a main tank storage portion 108. The main tank 201 in the main tank storage portion 108 and the sub tank 202 in the recording unit 102 are connected through an ink supply tube 104. An ink is supplied from the main tank 201 to the sub tank 202 through the ink supply tube 104 and then is ejected from the ejection orifices on the recording head 203. The numbers of main tanks, sub tanks, and ink supply tubes may correspond to the number of inks.

An ink (indicated by the hatching) stored in the main tank 201 is supplied through the ink supply tube 104 to the sub tank 202 and then is supplied to the recording head 203. To the main tank 201, a gas inlet tube 204 as an atmosphere communicating portion is connected. When an ink is consumed by image recording, a corresponding ink is supplied from the main tank 201 to the sub tank 202, and the ink in the main tank 201 is reduced. When the ink in the main tank 201 is reduced, air is introduced from the gas inlet tube 204 having one end open to the atmosphere, into the main tank 201, and thus a negative pressure for holding an ink in the ink supply system is kept substantially constant.

The first ink storage portion and the second ink storage portion (housings) can be formed of a thermoplastic resin such as polyester, polycarbonate, polypropylene, polyethylene, polystyrene, and polyphenylene ether; or a mixture or a modified material of such thermoplastic resins, for example. In the housing, an ink absorber capable of generating a negative pressure for holding an ink may be provided. The ink absorber is preferably compressed fibers formed of a resin such as polypropylene and polyurethane. Alternatively, no ink absorber is provided in a housing, and an ink may be stored in the housing.

The main tank 201 preferably has a larger maximum ink volume $V_1$ (mL) in order to reduce the frequency of changing tanks or injecting the ink, or to increase the number of recordable images to achieve high productivity. Specifically, the main tank 201 preferably has a maximum ink volume $V_1$ (mL) of 60 mL or more to 200 mL or less and more preferably 60 mL or more to 150 mL or less. The initial ink filling amount of the main tank 201 is preferably about 95% or less of the maximum ink volume.

The sub tank 202 also preferably has a larger maximum ink volume $V_2$ (mL) in order to reduce the frequency of supplying an ink from the main tank 201 or to stably fill an ink into the recording head 203. However, for example, when a case in which a serial-type ink jet recording apparatus as shown in FIG. 1 is used and the sub tank 202 is installed on the carriage 103 is supposed, it is preferred that the maximum ink volume $V_2$ (mL) of the sub tank 202 be not excessively large. In other words, if an excessively large amount of an ink is stored in the sub tank 202, the recording unit 102 becomes a large size, and this lowers the conveyance speed of the carriage 103 or necessitates an increase in strength of the endless belt 106 or of a motor power for conveying the carriage 103. On this account, the sub tank 202 preferably has a maximum ink volume $V_2$ (mL) of 1 mL or more to 35 mL or less, more preferably 2 mL or more to 20 mL or less, and particularly preferably 5 mL or more to 15 mL or less.

The recording unit 102 of the embodiment shown in FIG. 2 includes the recording head 203 and the sub tank 202. A recording unit as a head cartridge in which the sub tank is installed and the recording head is integrated may be installed on the carriage. A recording unit in which the sub tank and the recording head are integrally formed may be installed on the carriage. In the present invention, the sub tank 202 as the second ink storage portion is a housing formed of a thermoplastic resin and is directly bonded to the recording head (recording element substrate) 203 without other members such as a heat-dissipating plate interposed therebetween as shown in FIGS. 1 and 2. The presence of an adhesive or the like for bonding the housing and the recording element substrate is not intended to be eliminated. The ink ejection system of the recording head 203 is a system of applying thermal energy to an ink to eject the ink.

The difference between the temperature $T_2$ (° C.) of an aqueous ink stored in the sub tank 202 as the second ink storage portion and the temperature $T_1$ (° C.) of an aqueous ink stored in the main tank 201 as the first ink storage portion is preferably 5° C. or more. When the difference between the temperature $T_2$ (° C.) and the temperature $T_1$ (° C.) is 5° C. or more, the ejection stability of the ink can be further improved. The difference between the temperature $T_2$ (° C.) and the temperature $T_1$ (° C.) is preferably 40° C. or less, more preferably 30° C. or less, and particularly preferably 20° C. or less. The temperature $T_1$ (° C.) of an ink stored in the main tank 201 is preferably 5° C. or more to 40° C. or less, more preferably 10° C. or more to 35° C. or less, and particularly preferably 15° C. or more to 30° C. or less. The temperature $T_2$ (° C.) of an ink stored in the sub tank 202 is preferably 10° C. or more to 50° C. or less, more preferably 15° C. or more to 45° C. or less, and particularly preferably 20° C. or more to 40° C. or less.

The means of controlling the temperatures of inks stored in the main tank 201 and the sub tank 202 is not limited to particular means. For example, an ink temperature control unit can be provided outside or inside a tank. The ink temperature control unit can be exemplified by a unit of cooling an ink, a unit of heating an ink, and a unit of controlling an ink at a constant temperature. In the present invention, it is preferred that no ink temperature control unit be provided for the main tank 201 but the temperature of an ink stored in the sub tank 202 be controlled to control the difference between the temperature $T_2$ (° C.) and the temperature $T_1$ (° C.).

Figure 3:
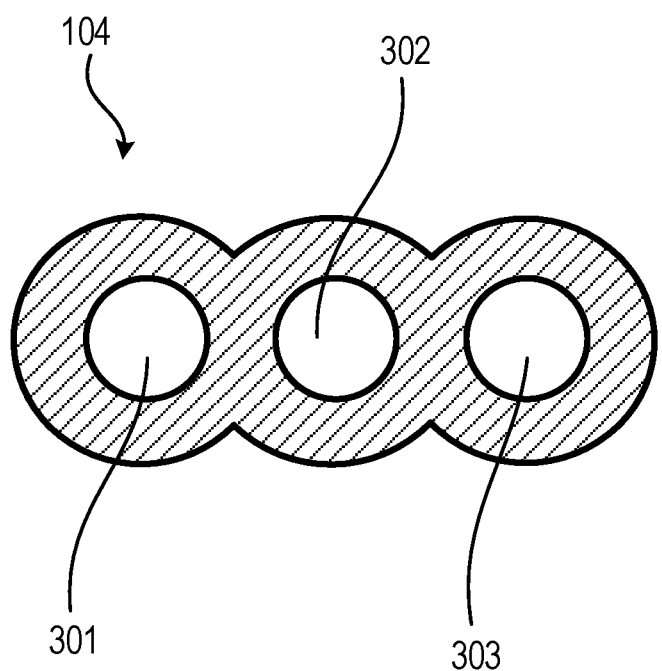
FIG. 3 is a schematic sectional view showing an example of ink supply tubes.

FIG. 3 is a schematic sectional view showing an example of ink supply tubes. As shown in FIG. 3, the ink supply tube 104 includes a first tube 301, a second tube 302, and a third tube 303 respectively corresponding to the respective aqueous inks. The second tube 302 has a portion interposed between and joined to the first tube 301 and the third tube 303. The tube corresponding to the magenta ink is the second tube 302. The tube corresponding to the cyan ink or the yellow ink may be either the first tube 301 or the third tube 303. To the ink supply tube, a tube corresponding to a black ink may be joined in addition to the tubes respectively corresponding to the cyan, magenta, and yellow inks. This is because even when a tube corresponding to a black ink is further joined, the tube corresponding to the magenta ink is still at a position between the other tubes.

The ink supply tube preferably has a water vapor transmission amount of 5.0 g/(m²·24 h) or less. If the ink supply tube has a water vapor transmission amount of more than 5.0 g/(m²·24 h), the ejection stability of an ink slightly deteriorates in some cases. The water vapor transmission amount of the ink supply tube is determined in accordance with the description in JIS K 7129 by using a sheet-like material having a thickness of 0.5 mm at a temperature of 23° C. The ink supply tube preferably has a water vapor transmission amount of 1.5 g/(m²·24 h) or more and more preferably 3.0 g/(m²·24 h) or more.

The ink supply tube is a member produced by molding a resin material into a tubular shape. The tube may be formed of a single resin material or a combination of two or more resin materials. The resin material may contain various additives. The structure of the tube may be a single layer structure or a multilayer structure. As the resin material, a thermoplastic elastomer is preferred because of excellent moldability, rubber elasticity, and flexibility. The thermoplastic elastomer is exemplified by olefinic resins, urethane resins, ester resins, styrenic resins, and vinyl chloride resins. Of them, styrenic thermoplastic elastomers are preferred because of particularly excellent flexibility and rubber elasticity. Additives contained in the resin material are exemplified by a softener, a lubricant, a surfactant, an antioxidant, an age inhibitor, an adhesiveness imparting agent, and a pigment.

The inner diameter and the wall thickness of the tube can be appropriately set in terms of productivity including moldability, flexural rigidity when a tube is taken around in a recording apparatus, ink supply properties, and gas barrier properties, for example. For example, the inner diameter of the tube is preferably 1 mm or more to 5 mm or less and more preferably 1 mm or more to 3 mm or less. The wall thickness of the tube is preferably 0.5 mm or more to 5 mm or less and more preferably 0.5 mm or more to 3 mm or less. The second tube is joined at a position between the first tube and the third tube, and thus has a noncircular cross section. The wall thickness of the second tube is considered as the equivalent circle diameter of the maximum diameter.

<Aqueous Ink>

The ink jet recording method of the present invention uses an ink jet recording apparatus that includes a plurality of aqueous inks including a cyan ink, a magenta ink, and a yellow ink. The ink jet recording apparatus is used, and the aqueous inks are ejected from a recording head by the action of thermal energy to record an image on a recording medium. In the present invention, a liquid that causes reaction or viscosity increase on contact with an aqueous ink is not necessarily used in combination. The plurality of aqueous inks including the cyan ink, the magenta ink, and the yellow ink will next be described in detail.

Coloring Material

As the coloring material, a pigment or a dye can be used. In the aqueous ink, the content (% by mass) of the coloring material is preferably 0.1% by mass or more to 15.0% by mass or less and more preferably 1.0% by mass or more to 10.0% by mass or less based on the total mass of the ink.

When a pigment is used as the coloring material, the dispersion method of the pigment is not limited to particular methods. For example, a resin-dispersed pigment dispersed by a resin dispersant, a pigment dispersed by a surfactant, and a microcapsule pigment prepared by covering at least a part of the particle surface of a pigment with a resin or the like can be used. In addition, a self-dispersible pigment prepared by bonding a functional group including a hydrophilic group such as an anionic group to the particle surface of a pigment and a pigment prepared by chemically bonding an organic group including a polymer to the particle surface of a pigment (resin-bonded self-dispersible pigment) can also be used. Needless to say, pigments different in dispersion methods can be used in combination.

The pigment usable as the coloring material is not limited to particular types. Specific examples of the pigment include inorganic pigments such as carbon black; and organic pigments such as azo pigments, phthalocyanine pigments, quinacridone pigments, isoindolinone pigments, imidazolone pigments, diketopyrrolopyrrole pigments, and dioxazine pigments. These pigments can be used singly or in combination of two or more of them as needed.

The dye usable as the coloring material is not limited to particular types. Specific examples of the dye include direct dyes, acid dyes, basic dyes, disperse dyes, and food dyes. Of them, a dye having an anionic group is preferably used. Specific examples of the dye skeleton include azo, triphenylmethane, phthalocyanine, azaphthalocyanine, xanthene, and anthrapyridone.

Each of three inks (the cyan ink, the magenta ink, and the yellow ink) preferably contains a dye as the coloring material. Unlike pigments that are dispersed as particles in aqueous inks, dyes are dissolved in aqueous inks. Hence, bubbles formed in an ink in the sub tank are not obstructed by particles and easily move in the direction opposite to the gravity, and the ejection stability of an ink can be further improved. In contrast, when three inks contain pigments as the coloring material, bubble movement is likely to be obstructed by particles, and bubbles adsorbed to the pigments are likely to come into the ink flow path together with the pigments. This slightly reduces the ejection stability of an ink in some cases.

Aqueous Medium

The aqueous ink can contain an aqueous medium that is a mixed solvent of water and a water-soluble organic solvent. The water-soluble organic solvent can be exemplified by solvents usable in ink jet inks, such as alcohols, (poly) alkylene glycols, glycol ethers, other nitrogen-containing compounds, and sulfur-containing compounds. These water-soluble organic solvents can be used singly or as a mixture of two or more of them. Although "water-soluble organic solvent" typically means a liquid, a solvent that is solid at 25° C. (normal temperature) is also included in the water-soluble organic solvent in the present invention. Specific examples of the water-soluble organic solvent that is generally used in inks and is solid at 25° C. include 1,6-hexanediol, trimethylolpropane, ethylene urea, urea, and polyethylene glycol having a number average molecular weight of 1,000. In the aqueous ink, the content (% by mass) of the water-soluble organic solvent is preferably 3.0% by mass or more to 50.0% by mass or less based on the total mass of the ink. As the water, deionized water or ion-exchanged water is preferably used. In the aqueous ink, the content (% by mass) of water is preferably 50.0% by mass or more to 95.0% by mass or less based on the total mass of the ink.

The water molar fraction of each ink can be controlled by the type or content of a water-soluble organic solvent having a molecular weight of 300 or less. For example, when the contents of water-soluble organic solvents are constant and the type is changed, use of a water-soluble organic solvent having a small molecular weight gives a smaller water molar fraction, and use of a water-soluble organic solvent having a large molecular weight gives a larger water molar fraction. Each ink preferably has a water molar fraction (%) of 80.0% or more to 99.5% or less and more preferably 90.0% or more to 98.0% or less.

Other Components

The aqueous ink may contain various additives such as a surfactant, an antifoaming agent, a pH adjuster, an antiseptic agent, an antifungal agent, an antioxidant, and a reduction inhibitor, as needed.

Physical Properties of Ink

The aqueous ink preferably has a viscosity of 1.0 mPa·s or more to 5.0 mPa·s or less and more preferably 1.0 mPa·s or more to 3.0 mPa·s or less at 25° C. The ink preferably has a static surface tension of 25.0 mN/m or more to 45.0 mN/m or less and more preferably 30.0 mN/m or more to 40.0 mN/m or less at 25° C. The ink preferably has a pH of 5 or more to 9 or less at 25° C.

EXAMPLES

The present invention will next be described in further detail with reference to examples and comparative examples, but the invention is not intended to be limited to the following examples without departing from the gist of the invention. The component amounts with "part" or "%" are based on mass unless otherwise noted.

<Preparation of Liquid Containing Coloring Material>

Dye Aqueous Solution 1

A dye (C.I. Direct Blue 199) was dissolved in ion-exchanged water, and then an acid was added thereto to precipitate the dye. The precipitated dye was filtrated and collected, giving a wet cake of the dye in a free acid form. The obtained wet cake was added to ion-exchanged water, then an aqueous solution of sodium hydroxide was added in an equivalent amount to an anionic group of the dye to completely neutralize the anionic group, and the dye was dissolved. An appropriate amount of ion-exchanged water was further added, yielding a dye aqueous solution 1 having a dye content of 10.0%.

Dye Aqueous Solution 2

A dye aqueous solution 2 having a dye content of 10.0% was prepared in the same procedure as for the dye aqueous solution 1 except that the dye was replaced with C.I. Acid Blue 9.

Dye Aqueous Solution 3

A dye aqueous solution 3 having a dye content of 10.0% was prepared in the same procedure as for the dye aqueous solution 1 except that the dye was replaced with C.I. Acid Red 289.

Dye Aqueous Solution 4

A dye aqueous solution 4 having a dye content of 10.0% was prepared in the same procedure as for the dye aqueous solution 1 except that the dye was replaced with C.I. Acid Red 249.

Dye Aqueous Solution 5

A dye aqueous solution 5 having a dye content of 10.0% was prepared in the same procedure as for the dye aqueous solution 1 except that the dye was replaced with C.I. Direct Yellow 132.

Dye Aqueous Solution 6

A dye aqueous solution 6 having a dye content of 10.0% was prepared in the same procedure as for the dye aqueous solution 1 except that the dye was replaced with C.I. Direct Yellow 86.

Pigment Dispersion Liquid 1

A commercially available pigment dispersion liquid containing a self-dispersible pigment (cyan pigment) (trade name "CAB-O-JET 250C", manufactured by Cabot) was used as a pigment dispersion liquid 1. In the pigment dispersion liquid 1, the pigment content was 15.0%.

Pigment Dispersion Liquid 2

A commercially available pigment dispersion liquid containing a self-dispersible pigment (magenta pigment) (trade name "CAB-O-JET 265M", manufactured by Cabot) was used as a pigment dispersion liquid 2. In the pigment dispersion liquid 2, the pigment content was 15.0%.

Pigment Dispersion Liquid 3

A commercially available pigment dispersion liquid containing a self-dispersible pigment (yellow pigment) (trade name "CAB-O-JET 270Y", manufactured by Cabot) was used as a pigment dispersion liquid 3. In the pigment dispersion liquid 3, the pigment content was 15.0%.

<Preparation of Ink>

Components (unit: %) shown in upper rows in Table 1 were mixed and thoroughly stirred, and the resulting mixtures were subjected to pressure filtration through a microfilter with a pore size of 3.0 μm (manufactured by Fujifilm Corporation), giving each ink. For water-soluble organic solvents (water-soluble compounds having a molecular weight of 300 or less) and water (ion-exchanged water), the molecular weights are indicated in the parentheses. "Acetylenol E 100" in Table 1 is the trade name of a surfactant (ethylene oxide [10 mol] adduct of acetylene glycol) manufactured by Kawaken Fine Chemicals. Lower rows in Table 1 show the contents (%) of water, molar number of water, molar number of water-soluble compounds having a molecular weight of 300 or less, and water molar fractions (%). In order to eliminate the effect of gas dissolved at the time of ink preparation, a general purpose degassing module was used to degas an ink until the dissolved oxygen amount reached 2 mg/L or less, and the ink was evaluated. The dissolved oxygen amount was determined by using a dissolved oxygen meter (trade name "Portable Dissolved Oxygen meter OM-71-L1", manufactured by HORIBA).

TABLE 1

Composition and properties of ink

| | Ink | | | | | | | | | | | |
|---|---|---|---|---|---|---|---|---|---|---|---|---|
| | C1 | C2 | C3 | C4 | C5 | C6 | C7 | C8 | M1 | M2 | M3 | M4 |
| Dye aqueous solution 1 | 35.0 | 35.0 | 35.0 | | | 35.0 | 35.0 | 35.0 | | | | |
| Dye aqueous solution 2 | | | | 35.0 | | | | | | | | |
| Pigment dispersion liquid 1 | | | | | 23.3 | | | | | | | |
| Dye aqueous solution 3 | | | | | | | | | 35.0 | 35.0 | 35.0 | |
| Dye aqueous solution 4 | | | | | | | | | | | | 35.0 |
| Pigment dispersion liquid 2 | | | | | | | | | | | | |
| Dye aqueous solution 5 | | | | | | | | | | | | |
| Dye aqueous solution 6 | | | | | | | | | | | | |
| Pigment dispersion liquid 3 | | | | | | | | | | | | |
| Glycerol (92.094) | 10.0 | 10.0 | | 10.0 | 11.0 | 11.0 | 7.0 | 12.0 | 10.0 | 10.0 | | 10.0 |
| 2-Pyrrolidone (85.106) | 5.0 | 5.0 | | 5.0 | 5.0 | 5.0 | 5.0 | 5.0 | 5.0 | 5.0 | 7.0 | 5.0 |
| 1-Hydroxyethyl-2-pyrrolidone (129.158) | | | 6.0 | | | | | | | | | |
| Triethylene glycol (150.174) | 7.0 | | | 7.0 | 7.0 | 12.0 | 10.0 | 12.0 | 6.5 | | | 6.5 |

TABLE 1-continued

Composition and properties of ink

|  |  |  |  |  |  |  |  |  |  |  |  |  |
|---|---|---|---|---|---|---|---|---|---|---|---|---|
| Bis(2-hydroxyethyl)sulfone (154.180) | 1.0 | 1.0 |  | 1.0 |  |  | 2.0 |  |  |  |  |  |
| 3-Methyl-1,5-pentanediol (118.176) |  |  |  |  |  | 2.0 | 2.5 |  |  |  |  |  |
| 1,5-Pentanediol (104.149) |  |  | 8.0 |  |  |  | 5.0 |  |  | 8.0 |  |  |
| Trimethylolpropane (134.175) |  |  | 7.0 |  |  |  |  |  |  | 7.0 |  |  |
| Ethylene urea (86.094) |  | 7.0 |  |  |  |  |  |  | 6.5 |  |  |  |
| Urea (60.056) |  |  |  |  |  | 10.0 |  |  |  |  |  |  |
| Acetylenol E 100 | 0.3 | 0.3 | 0.3 | 0.3 | 0.2 | 0.6 | 1.0 | 1.0 | 1.0 | 1.0 | 1.0 | 1.0 |
| Ion-exchanged water (18.016) | 41.7 | 41.7 | 43.7 | 41.7 | 53.5 | 34.4 | 32.0 | 25.5 | 42.5 | 42.5 | 42.0 | 42.5 |
| Content of water (%) | 73.2 | 73.2 | 75.2 | 73.2 | 73.3 | 65.9 | 63.5 | 57.0 | 74.0 | 74.0 | 73.5 | 74.0 |
| Molar number of water (mol) | 4.063 | 4.063 | 4.174 | 4.063 | 4.069 | 3.658 | 3.525 | 3.164 | 4.107 | 4.107 | 4.080 | 4.107 |
| Molar number of water-soluble compound (mol) | 0.220 | 0.255 | 0.175 | 0.220 | 0.225 | 0.275 | 0.368 | 0.351 | 0.211 | 0.243 | 0.211 | 0.211 |
| Water molar fraction (%) | 94.9 | 94.1 | 96.0 | 94.9 | 94.8 | 93.0 | 90.5 | 90.0 | 95.1 | 94.4 | 95.1 | 95.1 |

| | Ink | | | | | | | | | | | |
|---|---|---|---|---|---|---|---|---|---|---|---|---|
| | M5 | M6 | M7 | M8 | Y1 | Y2 | Y3 | Y4 | Y5 | Y6 | Y7 | Y8 |
| Dye aqueous solution 1 |  |  |  |  |  |  |  |  |  |  |  |  |
| Dye aqueous solution 2 |  |  |  |  |  |  |  |  |  |  |  |  |
| Pigment dispersion liquid 1 |  |  |  |  |  |  |  |  |  |  |  |  |
| Dye aqueous solution 3 |  | 35.0 | 35.0 | 35.0 |  |  |  |  |  |  |  |  |
| Dye aqueous solution 4 |  |  |  |  |  |  |  |  |  |  |  |  |
| Pigment dispersion liquid 2 | 23.3 |  |  |  |  |  |  |  |  |  |  |  |
| Dye aqueous solution 5 |  |  |  |  | 35.0 | 35.0 | 35.0 |  | 35.0 | 35.0 | 35.0 |  |
| Dye aqueous solution 6 |  |  |  |  |  |  |  | 35.0 |  |  |  |  |
| Pigment dispersion liquid 3 |  |  |  |  |  |  |  |  | 23.3 |  |  |  |
| Glycerol (92.094) | 11.0 | 12.0 | 7.0 | 12.0 | 11.0 | 11.0 |  | 11.0 | 11.0 | 12.0 | 10.0 | 10.0 |
| 2-Pyrrolidone (85.106) | 5.0 | 5.0 | 5.0 | 5.0 | 5.0 | 5.0 | 6.0 | 5.0 | 5.0 | 5.0 | 5.0 | 7.0 |
| 1-Hydroxyethyl-2-pyrrolidone (129.158) |  |  |  |  |  |  |  |  |  |  |  |  |
| Triethylene glycol (150.174) | 7.0 | 10.0 | 10.0 | 6.0 | 7.0 |  | 7.0 | 7.0 | 12.0 | 7.0 | 8.0 |  |
| Bis(2-hydroxyethyl)sulfone (154.180) |  |  |  | 3.0 | 2.0 |  | 3.0 |  |  | 1.5 |  |  |
| 3-Methyl-1,5-pentanediol (118.176) |  | 6.0 |  | 2.0 |  |  |  |  |  | 2.5 |  |  |
| 1,5-Pentanediol (104.149) |  |  |  |  |  | 8.0 |  |  |  | 5.0 |  | 3.0 |
| Trimethylolpropane (134.175) |  |  |  |  |  | 7.0 |  |  |  |  |  |  |
| Ethylene urea (86.094) |  |  |  |  |  |  | 7.0 |  |  |  |  |  |
| Urea (60.056) |  |  | 10.0 |  |  |  |  |  |  |  |  |  |
| Acetylenol E 100 | 0.4 | 1.0 | 1.0 | 1.0 | 1.0 | 1.0 | 1.0 | 1.0 | 0.4 | 1.5 | 0.6 | 1.0 |
| Ion-exchanged water (18.016) | 53.3 | 31.0 | 32.0 | 39.0 | 38.0 | 39.0 | 43.0 | 38.0 | 53.3 | 25.5 | 42.4 | 36.0 |
| Content of water (%) | 73.1 | 62.5 | 63.5 | 70.5 | 69.5 | 70.5 | 74.5 | 69.5 | 73.1 | 57.0 | 73.9 | 67.5 |
| Molar number of water (mol) | 4.058 | 3.469 | 3.525 | 3.913 | 3.858 | 3.913 | 4.135 | 3.858 | 4.058 | 3.164 | 4.102 | 3.747 |
| Molar number of water-soluble compound (mol) | 0.225 | 0.306 | 0.368 | 0.246 | 0.244 | 0.272 | 0.199 | 0.244 | 0.225 | 0.348 | 0.214 | 0.273 |
| Water molar fraction (%) | 94.7 | 91.9 | 90.5 | 94.1 | 94.1 | 93.5 | 95.4 | 94.1 | 94.7 | 90.1 | 95.0 | 93.2 |

45

TABLE 2

Evaluation conditions

| | | Cyan ink | | Magenta ink | | Yellow ink | | Difference of water molar fraction (%) | Ink corresponding to tube | | | Water vapor transmission amount of tube (g/m² · 24 h) | Ink temperature | | |
|---|---|---|---|---|---|---|---|---|---|---|---|---|---|---|---|
| | | | | | | | | | | | | | Main tank $T_1$ (° C.) | Sub tank $T_2$ (° C.) | $T_2 - T_1$ (° C.) |
| | | Type | Water molar fraction (%) | Type | Water molar fraction (%) | Type | Water molar fraction (%) | | First | Second | Third | | | | |
| Example | 1 | C1 | 94.9 | M1 | 95.1 | Y1 | 94.1 | 1.0 | C | M | Y | 4.0 | 20 | 30 | 10 |
|  | 2 | C1 | 94.9 | M1 | 95.1 | Y1 | 94.1 | 1.0 | Y | M | C | 4.0 | 20 | 30 | 10 |
|  | 3 | C2 | 94.1 | M2 | 94.4 | Y2 | 93.5 | 0.9 | C | M | Y | 4.0 | 20 | 30 | 10 |
|  | 4 | C3 | 96.0 | M3 | 95.1 | Y3 | 95.4 | 0.9 | C | M | Y | 4.0 | 20 | 30 | 10 |
|  | 5 | C4 | 94.9 | M1 | 95.1 | Y1 | 94.1 | 1.0 | C | M | Y | 4.0 | 20 | 30 | 10 |
|  | 6 | C5 | 94.8 | M1 | 95.1 | Y1 | 94.1 | 1.0 | C | M | Y | 4.0 | 20 | 30 | 10 |
|  | 7 | C1 | 94.9 | M4 | 95.1 | Y1 | 94.1 | 1.0 | C | M | Y | 4.0 | 20 | 30 | 10 |
|  | 8 | C1 | 94.9 | M5 | 94.7 | Y1 | 94.1 | 0.8 | C | M | Y | 4.0 | 20 | 30 | 10 |
|  | 9 | C1 | 94.9 | M1 | 95.1 | Y4 | 94.1 | 1.0 | C | M | Y | 4.0 | 20 | 30 | 10 |
|  | 10 | C1 | 94.9 | M1 | 95.1 | Y5 | 94.7 | 0.4 | C | M | Y | 4.0 | 20 | 30 | 10 |
|  | 11 | C1 | 94.9 | M1 | 95.1 | Y6 | 90.1 | 5.0 | C | M | Y | 4.0 | 20 | 30 | 10 |
|  | 12 | C6 | 93.0 | M6 | 91.9 | Y7 | 95.0 | 3.1 | C | M | Y | 4.0 | 20 | 30 | 10 |

TABLE 2-continued

| | | Cyan ink | | Magenta ink | | Yellow ink | | | Ink corresponding to tube | | | Water vapor transmission amount of tube (g/m² · 24 h) | Ink temperature | | |
|---|---|---|---|---|---|---|---|---|---|---|---|---|---|---|---|
| | | | Water molar fraction | | Water molar fraction | | Water molar fraction | Difference of water molar | | | | | Main tank $T_1$ | Sub tank $T_2$ | $T_2 - T_1$ |
| | | Type | (%) | Type | (%) | Type | (%) | fraction (%) | First | Second | Third | | (° C.) | (° C.) | (° C.) |
| | 13 | C1 | 94.9 | M6 | 91.9 | Y1 | 94.1 | 3.0 | C | M | Y | 4.0 | 20 | 30 | 10 |
| | 14 | C7 | 90.6 | M7 | 90.5 | Y8 | 93.2 | 2.7 | C | M | Y | 4.0 | 20 | 30 | 10 |
| | 15 | C6 | 93.0 | M8 | 94.1 | Y1 | 94.1 | 1.1 | C | M | Y | 4.0 | 20 | 30 | 10 |
| | 16 | C1 | 94.9 | M1 | 95.1 | Y1 | 94.1 | 1.0 | C | M | Y | 5.0 | 20 | 30 | 10 |
| | 17 | C1 | 94.9 | M1 | 95.1 | Y1 | 94.1 | 1.0 | C | M | Y | 5.5 | 20 | 30 | 10 |
| | 18 | C1 | 94.9 | M1 | 95.1 | Y1 | 94.1 | 1.0 | C | M | Y | 4.0 | 20 | 25 | 5 |
| | 19 | C1 | 94.9 | M1 | 95.1 | Y1 | 94.1 | 1.0 | C | M | Y | 4.0 | 20 | 23 | 3 |
| | 20 | C5 | 94.8 | M5 | 94.7 | Y6 | 90.1 | 4.7 | C | M | Y | 5.5 | 20 | 23 | 3 |
| Comparative Example | 1 | C1 | 94.9 | M1 | 95.1 | Y1 | 94.1 | 1.0 | C | M | Y | 4.0 | 20 | 30 | 10 |
| | 2 | C7 | 90.6 | M7 | 90.5 | Y8 | 93.2 | 2.7 | C | M | Y | 4.0 | 20 | 20 | 0 |
| | 3 | C1 | 94.9 | M1 | 95.1 | Y1 | 94.1 | 1.0 | C | M | Y | 4.0 | 20 | 30 | 10 |
| | 4 | C8 | 90.0 | M1 | 95.1 | Y1 | 94.1 | 5.1 | C | M | Y | 4.0 | 20 | 30 | 10 |
| | 5 | C1 | 94.9 | M1 | 95.1 | Y1 | 94.1 | 1.0 | C | Y | M | 4.0 | 20 | 30 | 10 |
| | 6 | C1 | 94.9 | M1 | 95.1 | Y1 | 94.1 | 1.0 | M | C | Y | 4.0 | 20 | 30 | 10 |

<Evaluation>

An ink jet recording apparatus that included a principal part with the structure shown in FIG. 1 and was integrated with an ink supply system with the structure shown in FIG. 2 was prepared. As the ink supply tube, a tube formed of a single layer resin material and having the shape shown in FIG. 3 was used. As for the maximum ink volumes of the main tank and the sub tank corresponding to each ink, the main tank had a maximum ink volume of 80 mL, and the sub tank had a maximum ink volume of 12 mL. The water molar fraction of each ink and the differences in water molar fraction (difference between a maximum value and a minimum value) and the water vapor transmission amounts of tubes are shown in Table 2. The ink corresponding to each tube shown in Table 2 was injected from the corresponding main tank so as to give 95% of the maximum ink volume and to fill the ink supply system with the ink. The structures of the sub tanks used in Examples and Comparative Examples are shown below.

Examples 1 to 20 and Comparative Examples 4 to 6

A sub tank had a structure in which a thermoplastic resin housing was bonded to a recording element substrate equipped with a recording head for ejecting inks by application of thermal energy.

Comparative Examples 1 and 2

A sub tank had a structure in which a thermoplastic resin housing was bonded to a recording element substrate equipped with a recording head for ejecting inks by application of thermal energy with an alumina heat-dissipating plate interposed therebetween.

Comparative Example 3

A sub tank had a structure in which a thermoplastic resin housing was bonded to a recording element substrate equipped with a recording head for ejecting inks by application of mechanical energy generated from a piezo element.

The temperatures $T_1$ (° C.) of inks stored in the main tank and the temperatures $T_2$ (° C.) of inks stored in the sub tank are shown in Table 2. The temperatures of inks were controlled as follows: The temperature of an ink stored in the main tank was controlled by setting the temperature of the evaluation environment. The temperature of an ink stored in the sub tank was controlled by a temperature control unit provided outside the sub tank. In the case of $T_2=T_1$, the temperature of an ink stored in the sub tank was controlled by setting the temperature of the evaluation environment as with the main tank. In the present examples, the recording duty of a solid image recorded in conditions in which two ink droplets each having a mass of 5.5 ng were applied to a unit region of 1/600 inch×1/600 inch was defined as 100%. In the present invention, "AA", "A", or "B" based on the following criteria was regarded as an acceptable level, and "C" was regarded as an unacceptable level. The evaluation results are shown in Table 3.

Ejection Stability

On the whole area of a PPC paper sheet with an A4 size, three inks were ejected at a recording duty of 2% (6% in total) to record 20 solid images, then the recording was suspended for 1 hour, and a nozzle check pattern was recorded. This cycle was repeated. The PPC paper sheet used was trade name "GF-500" (manufactured by Canon). After recording of a predetermined number of solid images, a nozzle check pattern was visually observed, and the ejection stability was evaluated based on the following criteria.

In the evaluation, the time interval after the start of evaluation was lengthened by increasing the number of sheets subjected to the recording. This lengthens the contact time of an ink and air in the main tank and makes the dissolved gas amount in the ink in the main tank to be likely to increase. The dissolved oxygen amount in each ink was determined after recording of a predetermined number of images, and the amount was within 5 to 7 mg/L. It was ascertained that the inks had a larger dissolved oxygen amount than the initial dissolved oxygen amount (2 mg/L or less). A case in which no disorder is caused on a nozzle check pattern even when the accumulated number of recorded images increases means that the deterioration of ejection stability due to bubbles is suppressed. In contrast, a case in which disorder is caused on a nozzle check pattern means that bubbles arising from dissolved gas that has increased in an ink come into the ink flow path in the recording head to prevent normal ejection of the ink.

AA: After recording of 7,000 solid images, almost no disorder was observed on a nozzle check pattern.

A: After recording of 6,000 solid images, disorder was slightly observed on a nozzle check pattern.

B: After recording of 5,000 solid images, disorder was slightly observed on a nozzle check pattern.

C: After recording of 3,000 solid images, disorder was slightly observed on a nozzle check pattern.

Color Tone Change

The above ink jet recording apparatus was used, and three inks were ejected at the total recording duties of 10% to 100% in an increment of 10% to record 10 solid images (5 cm×5 cm) on recording media. The recording media used were glossy paper (trade name "Canon Photo Paper, glossy professional [Platinum Grade]", manufactured by Canon). By equally dividing the ink application amounts of three inks on a solid image at each recording duty, gray line solid images from pale gray to black were recorded. The color tones of the recorded solid images were visually observed, and color tone changes were evaluated based on the following criteria. As for the color tone of gray line images, a reddish change is most noticeable on halftone images (around 50% in terms of recording duty). Hence, when no reddish color tone change is observed in a substantially halftone solid image, the color tone change is considered to be effectively suppressed.

AA: No reddish color tone change was observed on a solid image at each recording duty.

A: A slight reddish color tone change was observed on solid images at a recording duty of 40 to 60%.

B: A slight reddish color tone change was observed on solid images at a recording duty of 30 to 70%.

C: A reddish color tone change was observed on a solid image at each recording duty.

TABLE 3

Evaluation results

| | | Ejection stability | Color tone change |
|---|---|---|---|
| Example | 1 | AA | AA |
| | 2 | AA | AA |
| | 3 | AA | AA |
| | 4 | AA | AA |
| | 5 | AA | AA |
| | 6 | A | AA |
| | 7 | AA | AA |
| | 8 | A | AA |
| | 9 | AA | AA |
| | 10 | A | AA |
| | 11 | AA | B |
| | 12 | AA | B |
| | 13 | AA | A |
| | 14 | AA | A |
| | 15 | AA | A |
| | 16 | AA | AA |
| | 17 | A | AA |
| | 18 | AA | AA |
| | 19 | A | AA |
| | 20 | B | B |
| Comparative Example | 1 | C | AA |
| | 2 | C | A |
| | 3 | C | AA |
| | 4 | AA | C |
| | 5 | AA | C |
| | 6 | AA | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-213663, filed Oct. 30, 2015, which is hereby incorporated by reference herein in its entirety.

What is claimed is:

1. An ink jet recording method using an ink jet recording apparatus including a plurality of aqueous inks that include a cyan ink, a magenta ink, and a yellow ink, a first ink storage portion that has an atmosphere communicating portion, a second ink storage portion, a recording head that ejects the aqueous inks by action of thermal energy, and a tube member that supplies the aqueous inks from the first ink storage portion to the second ink storage portion, the second ink storage portion being a housing formed of a thermoplastic resin and being bonded to the recording head without another member interposed therebetween, the tube member including a first tube, a second tube, and a third tube respectively corresponding to the respective aqueous inks, the second tube having a portion sandwiched between and joined to the first tube and the third tube, the method comprising ejecting the aqueous inks from the recording head to record an image on a recording medium, wherein a difference between a maximum value and a minimum value of water molar fractions (%) of the cyan ink, the magenta ink, and the yellow ink is 5.0% or less, and wherein the tube corresponding to the magenta ink is the second tube.

2. The ink jet recording method according to claim 1, wherein each of the cyan ink, the magenta ink, and the yellow ink contains a dye.

3. The ink jet recording method according to claim 1, wherein the difference between the maximum value and the minimum value of water molar fractions (%) of the cyan ink, the magenta ink, and the yellow ink is 3.0% or less.

4. The ink jet recording method according to claim 1, wherein the difference between the maximum value and the minimum value of water molar fractions (%) of the cyan ink, the magenta ink, and the yellow ink is 1.0% or less.

5. The ink jet recording method according to claim 1, wherein the tube member has a water vapor permeation amount of 5.0 g/(m$^2$·24 h) or less.

6. The ink jet recording method according to claim 1, wherein a difference between a temperature T2 (° C.) of the aqueous inks stored in the second ink storage portion and a temperature T1 (° C.) of the aqueous inks stored in the first ink storage portion is 5° C. or more.

7. The ink jet recording method according to claim 1, further comprising a radiator plate, wherein the radiator plate is not interposed between the recording head and the second ink storage portion.

8. An ink jet recording apparatus used in the ink jet recording method according to claim 1, the apparatus comprising:

the plurality of aqueous inks including the cyan ink, the magenta ink, and the yellow ink;

the first ink storage portion having the atmosphere communicating portion;

the second ink storage portion;

the ink jet recording head that ejects the aqueous inks by action of thermal energy; and the tube member that supplies the aqueous inks from the first ink storage portion to the second ink storage portion.

9. The ink jet recording method according to claim 1, wherein the difference between the maximum value and the minimum value of water molar fractions (%) of the cyan ink, the magenta ink, and the yellow ink is at least 0.0%.

10. The ink jet recording method according to claim 1, wherein the tube member has a water vapor permeation amount of 3.0 g/(m$^2$·24 h) or more.

11. The ink jet recording method according to claim 1, wherein a difference between a temperature T2 (° C.) of the aqueous inks stored in the second ink storage portion and a temperature T1 (° C.) of the aqueous inks stored in the first ink storage portion is 40° C. or less.

12. The ink jet recording method according to claim 1, wherein a difference between a temperature T2 (° C.) of the aqueous inks stored in the second ink storage portion and a temperature T1 (° C.) of the aqueous inks stored in the first ink storage portion is 30° C. or less.

13. The ink jet recording method according to claim 1, wherein a difference between a temperature T2 (° C.) of the aqueous inks stored in the second ink storage portion and a temperature T1 (° C.) of the aqueous inks stored in the first ink storage portion is 20° C. or less.

14. The ink jet recording method according to claim 1, wherein a temperature T1 (° C.) of the aqueous inks stored in the first ink storage portion is 5° C. or more and 40° C. or less.

15. The ink jet recording method according to claim 1, wherein a temperature T2 (° C.) of the aqueous inks stored in the second ink storage portion is 10° C. or more and 50° C. or less.

16. The ink jet recording method according to claim 1, wherein the first ink storage portion has a maximum ink volume V1 (mL) of 60 mL or more and 200 mL or less.

17. The ink jet recording method according to claim 1, wherein the first ink storage portion has a maximum ink volume V1 (mL) of 60 mL or more and 150 mL or less.

18. The ink jet recording method according to claim 1, wherein the second ink storage portion has a maximum ink volume V2 (mL) of 1 mL or more and 35 mL or less.

19. The ink jet recording method according to claim 1, wherein the second ink storage portion has a maximum ink volume V2 (mL) of 2 mL or more and 20 mL or less.

20. The ink jet recording method according to claim 1, wherein the second ink storage portion has a maximum ink volume V2 (mL) of 5 mL or more and 15 mL or less.

* * * * *